July 30, 1968  J. R. KRING  3,394,648
PORTABLE BROILER
Filed Feb. 16, 1966
5 Sheets-Sheet 2
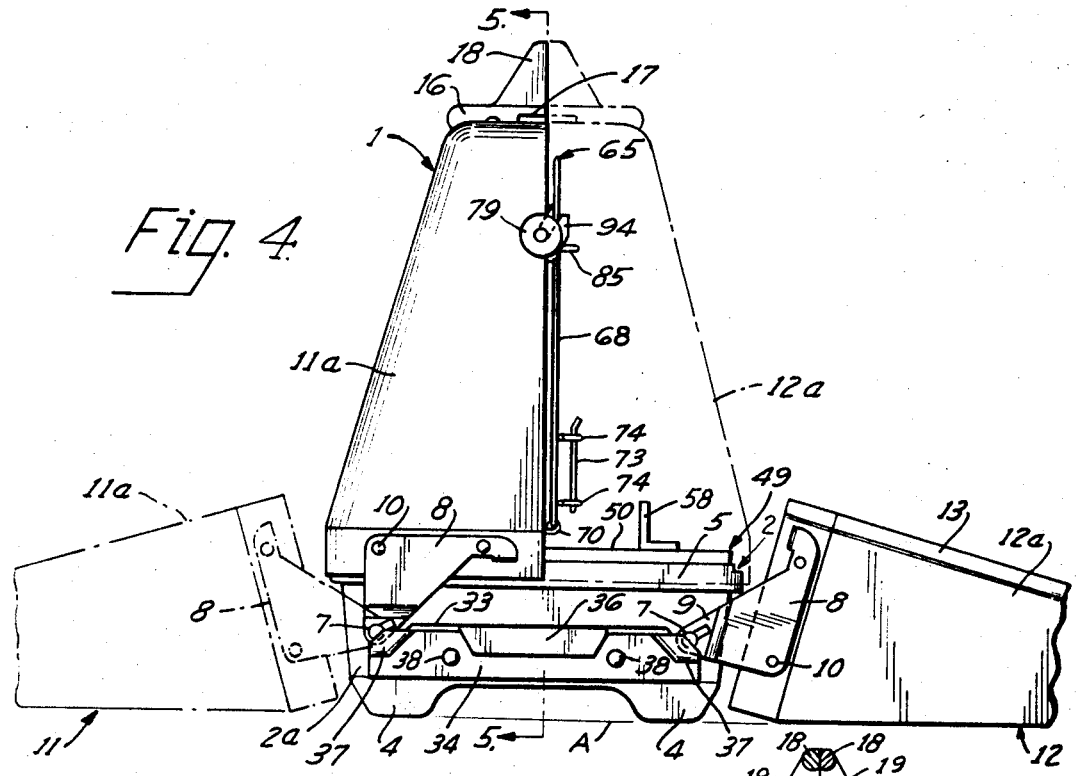
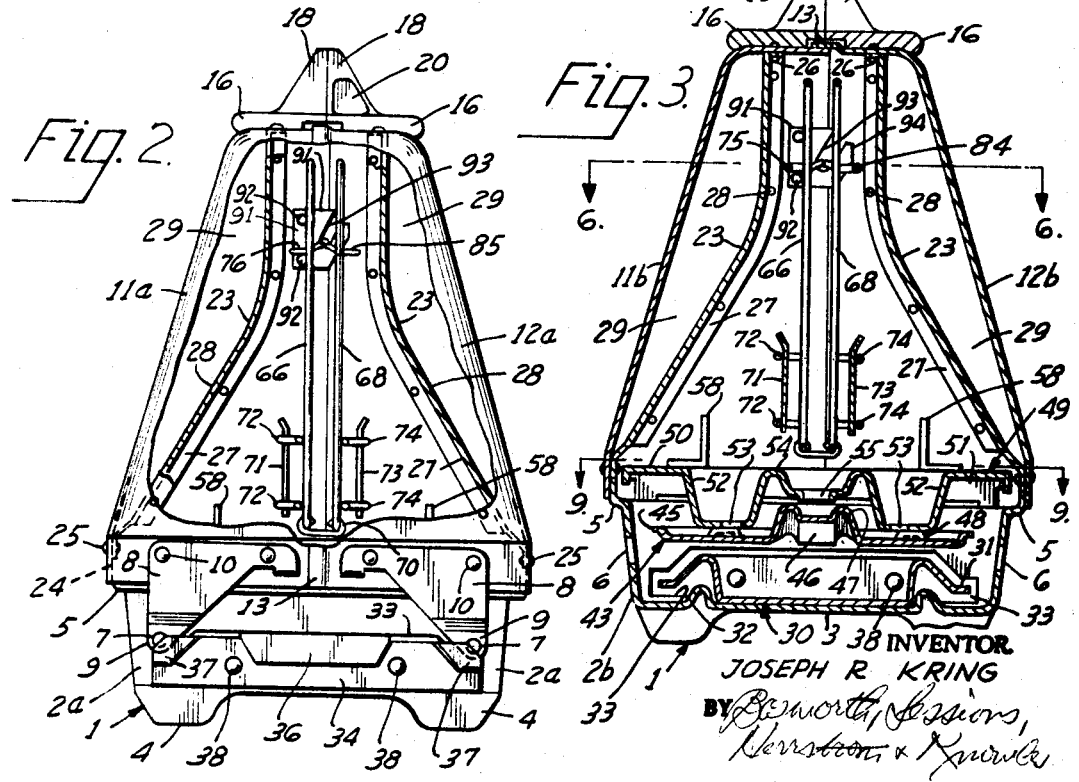
INVENTOR.
JOSEPH R. KRING
ATTORNEYS July 30, 1968  J. R. KRING  3,394,648
PORTABLE BROILER
Filed Feb. 16, 1966  5 Sheets-Sheet 3

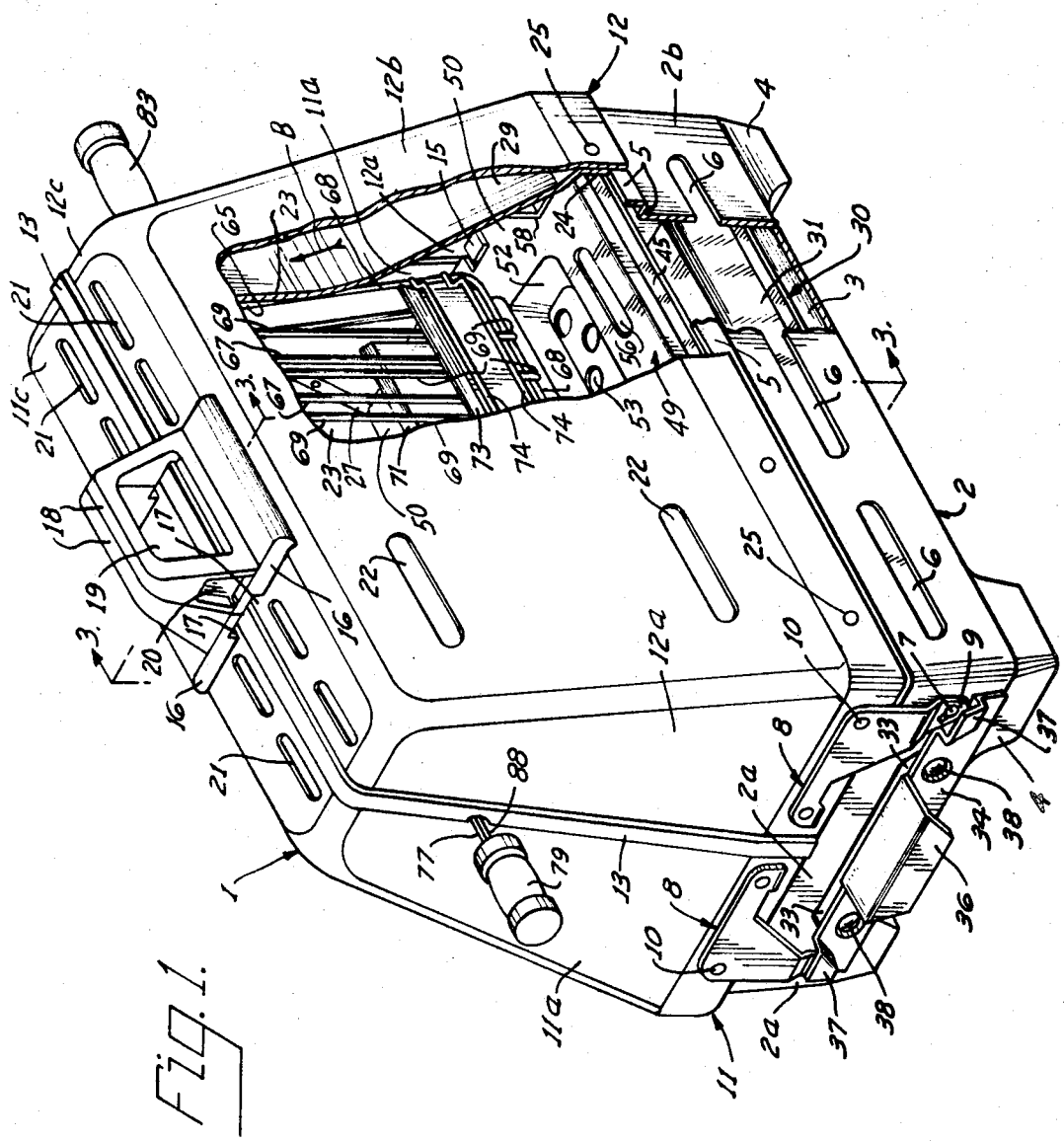

INVENTOR.
JOSEPH R. KRING
BY
ATTORNEYS.

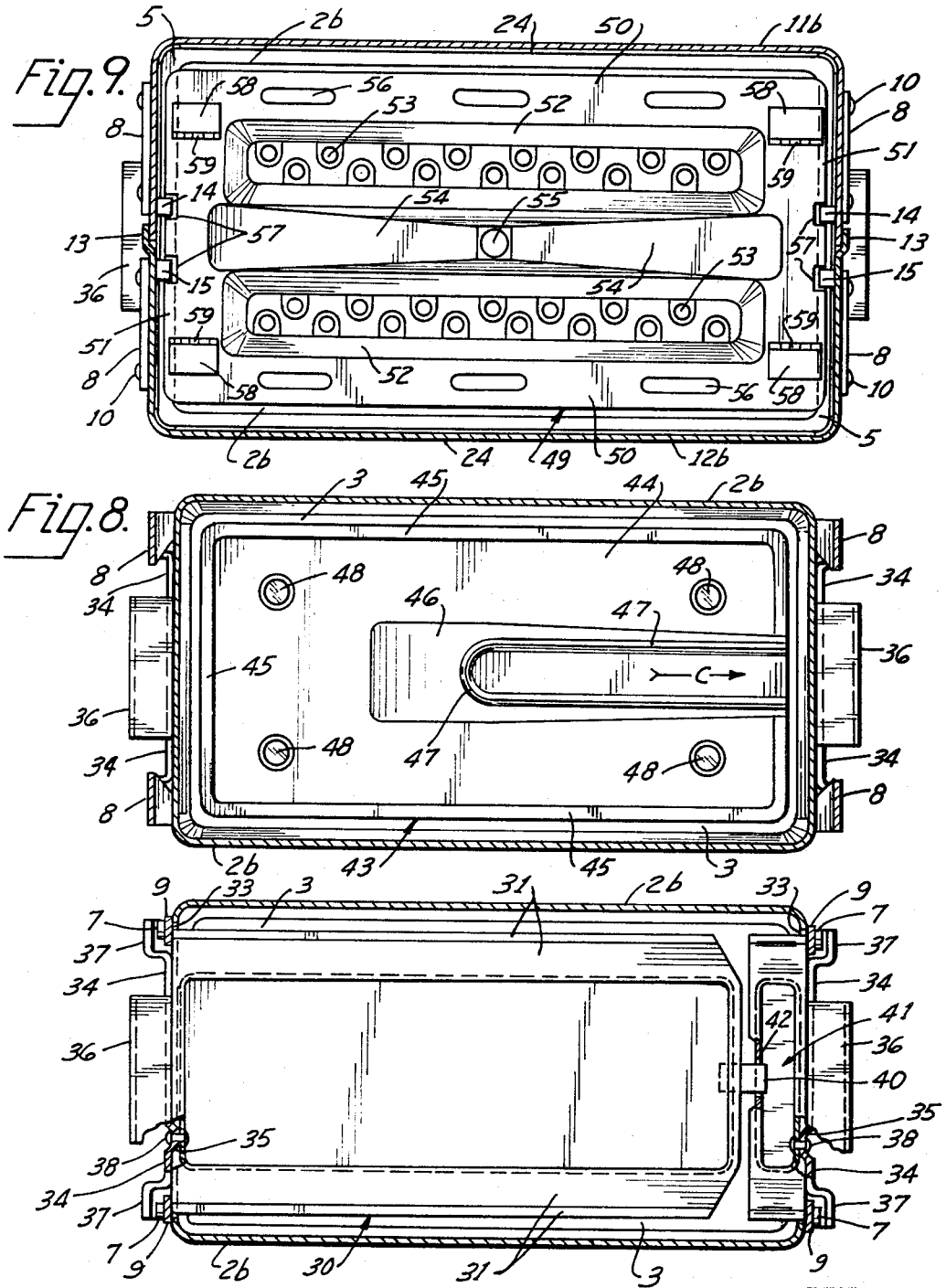

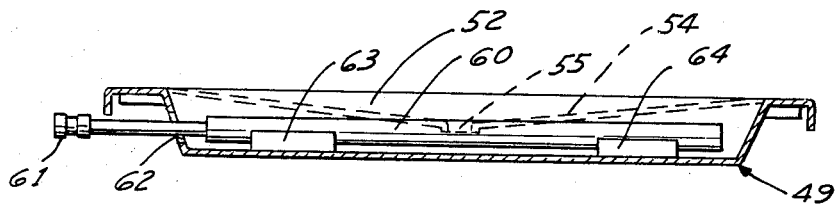
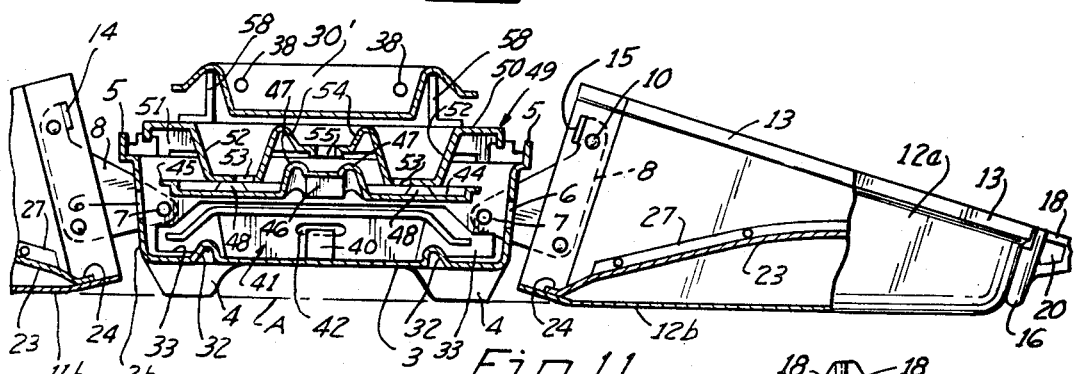
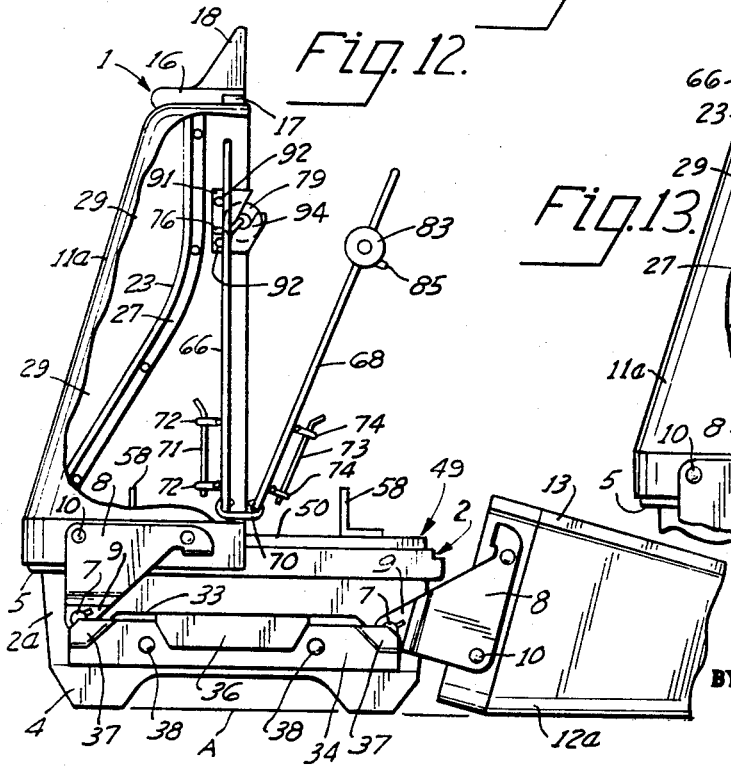
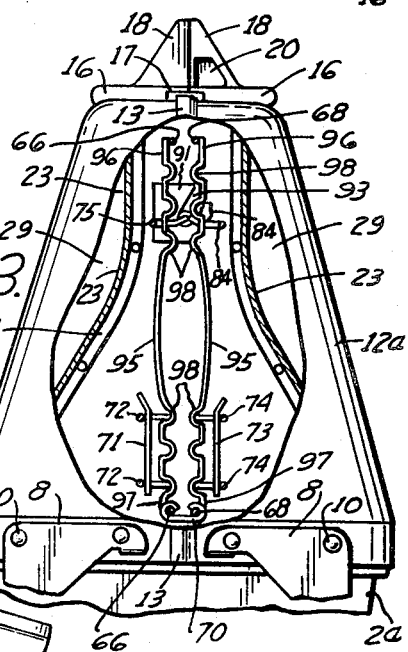

United States Patent Office 3,394,648
Patented July 30, 1968

3,394,648
PORTABLE BROILER
Joseph R. Kring, 20 Frazier Road,
Mansfield, Ohio 44906
Filed Feb. 16, 1966, Ser. No. 527,952
7 Claims. (Cl. 99—340)

ABSTRACT OF THE DISCLOSURE

A portable food cooking device comprised of a base; three separate pans within the base; a plurality of troughs forming part of the uppermost of the three pans; openings at opposite ends of the base for inserting and withdrawing the other two pans; means for preventing interference between them; and a vertically oriented food basket suspended above the base.

---

This invention deals with a highly portable broiler for indoor and outdoor use.

Although portable broilers are well known, the need for ease of handling and the related need for holding down the weight are factors which have generally led to the design of rather simple structures well suited for the performance of but a single function, ordinarily that of broiling meat or the like. On one hand the end of keeping the weight within a range making for easy handling by women and children and on the other the end of making the broiler adaptable to a variety of uses have usually been regarded as desiderata that are essentially incompatible. At any rate, as a general rule only broilers of a relatively simple nature have been highly portable and more complex structures, intended for performing a plurality of different functions, have often been non-portable.

The highly portable broiler of the present invention, offering in one and the same structure the advantage of light weight and the advantage of adaptability for the performance of several different functions, reconciles these apparently conflicting desiderata. This is accomplished in part by the rather general use of light weight metal stampings, which are normally of an aluminum alloy, and in part by an unusual degree of compactness in the design, arrangement and construction of those components that are to be used in the zone beneath the broiler basket. In the latter zone are accomplished all of the functions characterizing the broiler of the present invention except that of broiling meat or the like, for which purpose a drop-in broiler basket is provided.

Other objects, advantages and features of the invention will be apparent from the description which follows and from the accompanying drawings, in which:

FIGURE 1 is an isometric representation, partly broken away, of a broiler making use of the principles and features of the present invention.

FIGURE 2 is an end elevation of the broiler wherein the two half covers, both of which are in normal or upright position, are largely broken away to reveal the interior construction.

FIGURE 3 is a central section on a transverse vertical plane (line 3—3 of FIGURE 1) with both half covers in normal positions.

FIGURE 4 is an end elevation in which, for purposes of illustration, the left-hand half cover is shown in normal position and the right-hand half cover is shown in idle position.

Figure 5:
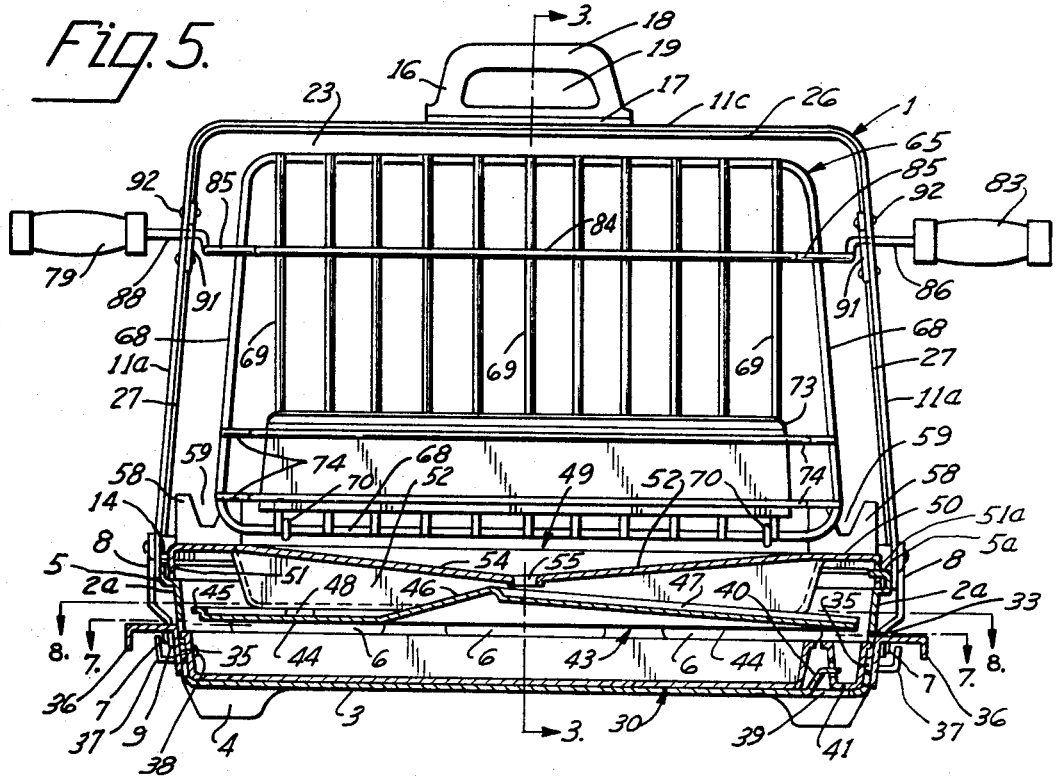
FIGURE 5 is a longitudinal vertical section in substantially the plane of cleavage between the two half covers but with the broiler basket shown in full elevation.

FIGURES 7 and 8 are horizontal sections as seen from lines 7—7 and 8—8 of FIGURE 5.

FIGURE 9 is a horizontal section as seen from line 9—9 of FIGURE 3.

FIGURE 10, intended to illustrate the use of an igniter tube, is a longitudinal vertical section through one of the troughs of the fire pan.

FIGURE 11 is a transverse vertical section through the broiler with the two half covers in idle positions and the broiler basket removed to permit the warming pan to be used above the fire pan.

FIGURE 12 is an end elevation similar to that of FIGURE 4 with parts broken away to show the manner in which the broiler basket can be opened.

FIGURE 13 is an end elevation similar to that of FIGURE 2 showing a portion of a broiler basket characterized by a modified configuration.

In FIGURES 1 to 5, the broiler is indicated generally at 1. As can be seen from FIGURE 1, it includes a box-like base 2 comprised of two upwardly flaring end walls 2a, two upwardly flaring side walls 2b, a bottom 3 and four corner feet 4, all of a light-weight metal such as an aluminum or aluminum-magnesium alloy. The open upper portion of base 2 has an outwardly projecting shoulder or offset portion 5 which follows the contour of the base top around most of its periphery. Formed in side walls 2b of base 2 are six horizontally extending air circulation slots 6, three in each side wall.

Supported on base 2 are the hinge pins 7 and hinges 8 appearing in FIGURES 2 and 4, of which there is a pair at each end of the broiler. The hinges of each pair are of opposite hand, of inverted L-shaped configuration, and pivotally mounted on the hinge pins. The lowermost portion 9 of each of the four hinges is relatively narrow, offset inwardly from the rest of the hinge, and disposed with its inside face in apposition to end wall 2a of the base. The upper or broad portion of each is rigidly attached, as by rivets 10, to the proximate portion of end 11a or end 12a (as the case may be) of one of two generally similar, but not identical, half covers 11 and 12, both of aluminum or other light-weight metal.

As indicated in FIGURE 4, half covers 11 and 12 are susceptible of being moved out of their normal positions into idle positions in which sides 11b and 12b overlie surface A; viz., a table top, patio floor or the like.

In the same figure it will be observed that in the case of half cover 11 the portion of end 11a immediately adjoining the cleavage plane is substantially flat. In this respect it differs from the corresponding portion of end 12a of half cover 12, which in this zone is formed with an outwardly offset but integral closure strip 13. From a comparison of FIGURES 1 and 5, it will further be observed that ends 11a and 12a of half covers 11 and 12 are provided with openings through which pass rectangular tabs 14 and 15. The latter form part of, and project inwardly from, hinges 8: see FIGURE 9.

Rigidly fastened to the upper portion 11c of half cover 11 is an aluminum top plate 16 the lower part of which is cut away at 17 to accommodate closure strip 13: see FIGURES 1 and 3. Extending upward therefrom is a half-handle 18 provided with a transverse opening 19 wide enough to accommodate the four fingers of one hand. On upper portion 12c of half cover 12 is a similar top plate 16, likewise cut away at 17, that is similarly provided with a half-handle 18 and a transverse opening 19 for the fingers. In such half handle, a grasping recess 20 is provided for the thumb: see FIGURES 1 and 2. When in engagement with each other, half-handles 18 form the carrying handle for the broiler.

In upper portion 11c of half cover 11 and also in upper portion 12c of half portion 12 is a longitudinally extending series of slots 21. Shown in FIGURE 1, slots 21 are provided to permit and facilitate escape from the broiler of hot gaseous products of combustion. The latter are directed inward and upward by the inclined inner surfaces on the aluminum heat-deflecting baffles 23 appearing in FIGURES 1 to 3. Elsewhere, more particularly in sides 11b and 12b, each of half covers 11 and 12 is further equipped with a group of four ventilating slots 22. Located outwardly of heat-deflecting baffles 23, ventilating slots 22 promote the upward circulation of cooling air indicated by arrow B (FIGURE 1).

Each of the two heat-deflecting baffles 23 is equipped with a laterally offset integral bottom flange 24 that is provided in order to facilitate attachment, as by riveting or spot-welding at 25, to the bottom portion of the side of the half cover with which the baffle is associated. As indicated in FIGURES 3 and 5, inwardly directed flanges 26 are provided along the top edges of baffles 23. Rivets or spot-welds may be used to hold them to top portions 11c and 12c of half covers 11 and 12. Along the ends of baffles 23 are inwardly directed flanges 27, best seen in FIGURES 2 and 3, for attaching the ends of the baffles to the ends 11a and 12a of half covers 11 and 12, likewise by means of rivets or spot welds.

The presence of baffles 23 thus results in the formation of interior chambers 29 through which cooling air can circulate.

As can be seen from FIGURES 3, 5 and 7, room may be left immediately above bottom 3 of base 2 for a multiple purpose metal tray 30 which, if desired, may be used in place as a warming pan. Along its lateral edges pan 30 is equipped with depending flanges 31; below such flanges are the pan guides, which consist of longitudinally extending re-entrant portions 32 in the bottom of base 2. In end wall 2a of the base is a broad cut-out portion 33 making possible insertion of and removal of the pan. At the end of the broiler appearing in FIGURES 1, 2 and 4 and at the end of the pan appearing at the left in FIGURE 7 are the means by which the pan is introduced and withdrawn.

In the normal use of pan 30; that is to say, when it is used for the warming of food, a metal face plate 34 attached to the proximate end of the pan conceals much, but not all, of opening 33. Formed integrally with but in any event constituting parts of face plate 34 are dimples 35 (FIGURES 5 and 7), handle 36, and offset portions 37 (FIGURES 1 and 5). Dimples 35, one near each end, accommodate the rivets 38 by which face plate 34 is fastened to the pan. Offset portions 37 serve to shield hinge pins 7 and hinges 8 and thus protect them from possible damage.

Reference to FIGURES 5 and 11 will show that, except for re-entrant portions 32, bottom 3 of base 2 is flat. Its continuity is interrupted only by an oblong opening 39 formed by incising a portion of bottom 3 seen at the right in FIGURE 5. By incising on three sides only, an integral tab 40 is produced which can be bent as shown to serve as a stop for pan 30. As will appear, tab 40 also serves a second function, viz., that of positioning transverse trough 41, which will next be described.

A transverse trough 41 with an attached face plate 34 (FIGURE 5) is provided to receive any liquids dripping from the food that is being broiled and, if there should be some danger of overflowing, to permit the excess to escape through slot 42 (FIGURES 5, 7 and 11) and opening 39 in bottom 3 of base 2. At its ends, seen in FIGURE 11, transverse trough 41 is provided with flanges similar to lateral flanges 31 on pan 30. Its end-to-end measurement and the side-to-side measurement of the pan are the same. As will be apparent from FIGURE 5, from top to bottom the two are of the same or very nearly the same height.

Overlying pan 30 and transverse drip trough 41 is a horizontal ash-receiving baffle 43 formed as indicated in FIGURES 3, 5 and 8. Its measurements are such as to permit it to clear end walls 2a and side walls 2b of base 2 above pan 30. Flat (as at 44) over much but by no means all of its area, baffle 43 is provided with end and lateral flanges 45 that are elevated above the general plane of the baffle itself. Such end and lateral flanges are well spaced from the end and side walls of base 2: see FIGURES 5 and 8.

Formed integrally with or welded to the flat portion 44 of baffle 43 is an upstruck portion 46 of rectangular outline, best seen in FIGURES 5 and 8. Upstruck portion 46, roughly one-third as wide and approximately three-quarters as long as flat portion 44, is present for the purpose of providing a downwardly inclined drain channel for drip. Such drain channel, which is defined by end and side walls 47, may be formed by reversely striking the area between them. As indicated by arrow C in FIGURE 8, the intercepted drip travels downward toward the right-hand end of the baffle, spilling over such end into transverse trough 41.

To support baffle 43, the flat portion 44 surrounding upstruck portion 46 is provided with four integral bosses 48 (FIGURE 8). Measured from flat portion 44 of baffle 43, the elevation or height of bosses 48 is the same as that of flanges 45. Preferably, bosses 48 and the proximate bottom portion of an overlying fire pan 49 (FIGURES 3 and 5) are bonded together, as by spot welding. Bosses 48 not only serve to support baffle 43 but act as spacers allowing air entering the broiler through slots 6 to flow across the bottom of the baffle 43 on its way to the fire pan. Ashes dropping from the fire pan are caught and retained by flat portion 44 of baffle 43.

The over-all configuration of fire pan 49 can best be understood from a comparison of FIGURES 3, 5 and 9. As will be apparent therefrom, there is a flat top portion 50 which extends around the entire periphery of the fire pan after the fashion of a frame. Formed integrally with it at the ends of the fire pan are two depending supports 51 that rest squarely on shoulder 5 of base 2. In one of them, seen at the right in FIGURE 5, is an opening 51a adapted to receive a horizontal positioning tab 5a that extends inwardly from shoulder 5. Tab 5a precludes reversed installation of fire pan 49.

Forming part of fire pan 49 in the zones that immediately overlie bosses 48 on baffle 43 are two like fire troughs 52 which extend lengthwise in parallel relation to each other. As appears from FIGURE 9, each of the two fire troughs has at the bottom thereof two series of holes 53, fifteen in each of the two fire troughs. Holes 53 serve the dual purpose of permitting air to reach the fuel being burned in the fire troughs and allowing ashes to drop therethrough onto flat portion 44 of baffle 43.

Fire pan 49 is provided between primary troughs 52 with a relatively shallow generally V-shaped secondary trough 54 with a hole 55 at the bottom thereof: it is through hole 55 that the drip from the food being broiled reaches the drain channel in the baffle.

The continuity of the flat surface 50 which frames fire pan 49 is broken on its sides by air slots 56 and at its ends by openings 57. In the latter are accommodated two tabs 14 and two tabs 15, the former being associated with the hinges on half cover 11 and the latter with the hinges on half cover 12. Tabs 14 and 15 and openings 57 are present for the purpose of limiting the extent of the permissible side-to-side movement of fire pan 49, in addition to which the tabs stop half covers 11 and 12 in upright position. Welded to flat portion 50 of fire pan 49 not far from the cut away reliefs appearing in the four corners thereof in FIGURES 4, 11 and 12 are four L-shaped brackets 58 characterized by deep polygonal slots 59: the purposes for which these are provided will appear below.

FIGURE 10 illustrates how a propane lighter tube 60 with a coupling element 61 connected to it at its outboard end may be mounted in one of the fire troughs 52 of fire pan 49. In one end of trough 52, seen at the left in FIGURE 10, is a suitably shaped and sized opening 62 for endwise insertion of the blind end of lighter tube 60. Below the tube are supporting brackets 63 and 64 that may, if desired, be introduced from above. Alternatively, burner tubes analogous to lighter tube 60 may constitute permanent parts of troughs 52.

Figure 6:
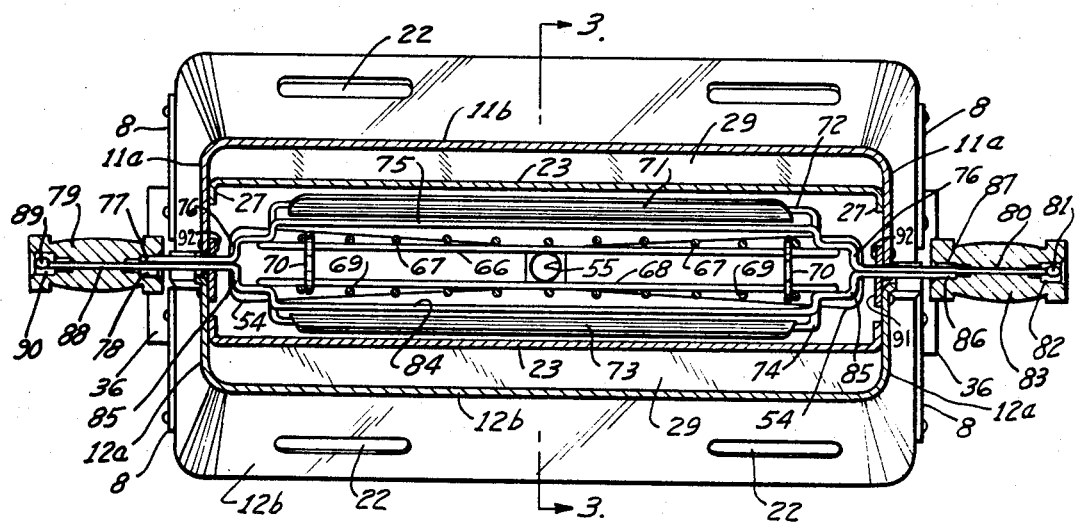
FIGURE 6 is a horizontal section as seen from line 6—6 of FIGURE 3.

The broiler basket, indicated generally by reference character 65, apppears in FIGURES 5, 6 and 12, the first of which shows it as seen in its entirety in side elevation. Thus it is the near side of the basket, i.e., the side appearing in FIGURE 5, that is seen angled in FIGURE 12. From FIGURES 6 and 12 it will be observed that the broiler basket is made up of two largely independent grids. The grid not seen in FIGURE 5 (i.e., the far grid) consists in part of a generally oblong wire frame 66 and in part of a series of eleven parallel transversely extending somewhat flexible wires 67 welded at their ends to the long sides of wire frame 66. The near grid similarly consists of a like oblong wire frame 68 to the long sides of which is welded a series of eleven parallel transversely extending somewhat flexible wires 69.

At the bottom of the basket, two open wire loops 70 connect the two grids, the ends of the loops seen at the left in FIGURES 2, 3 and 12 being welded to wire frame 66. Associated with the lower ends of the two grids, in order to prevent over-heating in this area, are the two heat-deflecting shields seen in FIGURES 2 to 5 and 12. One of them, designated 71, is welded to upper and lower horizontally extending wires 72 forming part of the far grid. The other, designated 73, is welded to two similar horizontally extending wires 74 forming part of the near grid. Wires 72 and 74 are welded at their ends to the respective grids. Inwardly of their ends they are stepped as shown in FIGURE 6.

To facilitate manipulation of basket 65 as a separate unit capable of being readily introduced into and removed from the broiler and to make possible separation of the grids, if and when desired, after the fashion illustrated in FIGURE 12, basket 65 is equipped with a sub-assembly consisting of two horizontally extending handle-bearing rods and two like interchangeably formed handles slideable endwise thereof. As will appear, the handles may be moved to only a limited extent on the rods; however, they are susceptible of being urged into extended positions when separation of the grids is contemplated and into retracted positions when it is desired to manipulate the basket as a unit. The manner in which the grids, the handle-bearing rods and the handles are related will next be explained.

To the rear of the basket, seen in elevation as in FIGURE 5, is a horizontally extending metal rod 75 the ends of which are formed with the stepped portions 76 seen in FIGURE 6. Stepped portions 76 are welded to the wire frame 66 of the far grid on the short sides of the oblong. At the left-hand end of the broiler, seen as in FIGURES 1 and 5, rod 75 extends outwardly of half covers 11 and 12 into a zone directly above lifting handle 36. This portion of the rod, referred to hereinafter as short end 77, terminates in a stepped chamber 78 at the inner end of handle 79: see FIGURE 6. The step in chamber 78, preferably taking the form of an annular shoulder, thereby precludes undue retraction of handle 79 on rod 75 by serving as a stop for short end 77.

At the opposite or right-hand end of the broiler, rod 75 is formed with a long end 80 that extends for a considerable distance beyond the correspondingly located zone directly above lifting handle 36. It terminates as shown in FIGURE 6, in a flat 81 disposed in a stepped chamber 82 at the outer end of handle 83. When the latter is moved from retracted to extended position, flat 81 engages the portion of the handle adjoining the rod at the base of the chamber. Flat 81 acts to prevent handle 83 from becoming separated from rod 75 on movement of the handle into extended position and, since it serves no other purpose, may if desired take the form of a cap rigidly affixed to rod 75.

On the near side of the basket, seen as in FIGURE 5, is a like rod 84 characterized by stepped portions 85 not far from its ends. In this vicinity, rod 84 is welded to the wire frame 68 outlining the near grid. Like rod 75, of which it is a duplicate, rod 84 extends beyond the broiler at each end thereof. Short end 86 projects to the right in FIGURE 6, extending into and terminating within a stepped chamber 87 at the inner end of handle 83. At the opposite end of rod 84, long end 88 extends into and virtually through handle 79. Long end 88 terminates in a flat 89 disposed in a stepped chamber 90 at the outer end of handle 79. The action is the same as that which has already been described in the case of rod 75.

It will be apparent from FIGURE 6 that by sliding handles 79 and 83 to the left and right, respectively, short ends 77 and 86 of rods 75 and 84 will be released. Separation of the rods and attendant separation of the grids can then be accomplished by moving the handles transversely; i.e., laterally, in opposite direction. Basket-closing movement of the handles (i.e., movement in the opposite direction) serves to bring the short ends of the rods into engagement with the long ends, after which the handles may be retracted. When the short ends of the rods engage their respective stops, inward movement of handles 79 and 83 comes to an end and the basket is secured against inadvertent opening.

Thus, notwithstanding the fact that rods 75 and 84 are reversed end-for-end, the construction and mode of operation at the left-hand and right-hand ends of the sub-assembly just described are identical.

Outwardly of the stepped portions 76 and 85 of rods 75 and 84, two flat brackets 91, one at each end of the broiler, are mounted on the inside faces of ends 11a of half covers 11, as by rivets 92 (FIGURES 2 and 3). Brackets 91 are formed with diagonally extending slots 93 the location and length of which are such as to produce hook-like projections 94 on brackets 91. Such projections extend beyond the cleavage plane between half-cover 11 and half cover 12: see FIGURES 3 and 4.

With the basket open and half cover 12 in idle position, as in FIGURE 12, rods 75 and 84 may be dropped into slots 93 one at a time or together. If the former, rod 75 is first dropped into place, positioning the far grid; thereafter, rod 84 is dropped into place, positioning the near grid. Because slots 93 are rather wide, preferably wide enough to accommodate both rods in side-by-side relation, the two rods come to rest on the bottoms of slots 93: see FIGURES 2 and 3. Half cover 12 may then be raised into its normal upright position, after which the broiler, if otherwise ready for use, may be employed in broiling food.

By reversing the steps just described, basket 65 may readily be opened up or, if desired, removed from the broiler for emptying and cleaning.

In FIGURES 1 to 12, inclusive, broiler basket 65 has been shown throughout as it appears when the transversely extending wires 67 and 69 of the two grids are substantially straight but sufficiently flexible for normal requirements. This construction, which is self adjusting, has advantages, but for some purposes a different construction may be preferred, as, for example, that shown in FIGURE 13, in which the transverse wires 95 used in the two grids are bowed over their middle portions to permit basket 65 to accommodate steaks and patties of unusually great thickness. With or without bowed portions of the kind just described, the upper ends 96 and lower ends 97 of the grid wires may and often will be provided with integrally formed loops 98 that bear inwardly to facilitate gripping of the item or items to be broiled, particularly if it is relatively thin. In virtually all other respects, the near and far grids of FIGURE 13 are the same or substantially the same as the corresponding grids of FIGURES 1 to 12, inclusive.

Assuming now that both half covers are in idle position, warming pan 30 may be grasped by the lifting handle 36 seen at the left in FIGURES 1 and 5, pulled endwise out of base 2 through opening 33, and relocated on brackets 58. See FIGURE 11, wherein the new position of warming pan 30 is indicated by reference character 30′. With this arrangement, pan 30 may then be used for preparing fried foods, particularly at times when the temperatures developed immediately above troughs 52 in fire pan 49 are sufficiently high for pan frying purposes. In this way, warming pan 30, relocated as shown at 30′, can serve the second of two contemplated functions; viz., that of pan frying food lending itself to preparation in this manner. Not only this but brackets 58, which are provided as previously noted with notches 59, may likewise be used to perform a second function; viz., that of supporting in horizontal position a wire broiling basket of simpler construction than basket 65 or, if desired, a two-sided metal frame of open wire mesh of the kind sometimes used for toasting bread.

It has been pointed out above that baffle 43 is also a dual-purpose component of the broiler, this in the sense that it serves both to catch ashes dropping through openings 58 in troughs 52 and to carry off melted fat dripping into the drain channel through central opening 55 in fire pan 49. The second of these functions is performed not only when broiler basket 65 is in place, as in FIGURES 2 and 3, but also when a broiler basket analogous to broiler basket 65 but of simpler construction is supported as described above in horizontal position in the notches 59 of brackets 58. When warming pan 30 is used in position 30′, there is of course no drip through opening 55 in fire pan 59; however, the flat portion 44 of baffle 43 still serves the function of intercepting and retaining ashes dropping through openings 53 in troughs 52.

From FIGURES 2, 3 and 5 it will be apparent that the broiler basket per se lends itself to incorporation in broilers of specifically different design in which the structure below the broiler basket differs from what is shown in FIGURES 1 to 13. From FIGURE 11, wherein broiler basket 65 and warming pan 30 are absent from their usual positions, it will be apparent that those components (exclusive of half covers 11 and 12) which appear in that figure may be employed in other devices of rectangular shape designed less for broiling than for toasting and pan frying. In general, it may be said that the entire superstructure is susceptible of use in other installations. The substructure, including all of the elements shown in FIGURE 11 except the top covers, may likewise be said to lend itself to use in other settings. A wide variety of other changes may be made as a matter of routine by those skilled in the art without departing from the spirit of the invention.

It is intended that the patent shall cover, by summarization in appended claims, all features of patentable novelty residing in the invention.

What is claimed is:

1. A readily portable food cooking device comprising a box-like base; a plurality of pans removably stacked within such base, the uppermost being supported mainly from its upper portion and the lowermost mainly from its lower portion; a pair of like fuel burning primary trough disposed within and forming part of the uppermost pans; a secondary trough for receiving drip separating the primary troughs; and a vertically oriented basket disposed above the secondary troughs for holding the food to be cooked.

2. A cooking device according to claim 1 wherein the secondary trough is provided with means permitting drip to pass therethrough.

3. A cooking device according to claim 2 wherein drip-intercepting means intervene between said drip-passing means and the lowermost of said pans.

4. A cooking device according to claim 3 wherein said drip-intercepting means include a drip-diverting drain channel.

5. A cooking device accordfing to claim 4 wherein said drain channel leads to a collecting trough within the base.

6. A cooking device according to claim 4 wherein the drip-intercepting means take the form of a baffle rigidly affixed to the bottom of the uppermost of said pans.

7. A food broiler comprising a generally rectangular base; a fire pan within the base; two half covers pivotally mounted on the base over the fire pan; a vertically oriented broiler basket comprised of two like grids each of which is supported from one of said half covers by a rod paralleling the longitudinal axis of the base; and rod-confining handles on the rod ends, one handle at each end of the broiler, for optionally holding the grids together or releasing them to permit them to separate.

References Cited

UNITED STATES PATENTS

| | | | |
|---|---|---|---|
| 716,366 | 12/1902 | Bayno | 219—403 |
| 904,382 | 11/1908 | Van Patten | 99—400 X |
| 1,443,546 | 1/1923 | Mieville | 99—400 X |
| 1,450,381 | 4/1923 | Mieville | 99—401 X |
| 1,713,303 | 5/1929 | Serrell | 99—400 X |
| 1,729,552 | 9/1929 | Shadley et al. | 99—391 |
| 1,762,257 | 6/1930 | Burkhardt | 99—397 |
| 1,997,192 | 4/1935 | Kasamis | 99—391 |
| 2,102,097 | 12/1937 | Sherman | 99—390 |
| 2,510,856 | 6/1950 | Bettencourt | 99—400 |
| 3,088,395 | 5/1963 | Miller | 99—340 |
| 1,051,503 | 1/1913 | Klein | 99—444 XR |
| 1,745,340 | 1/1930 | Parker | 99—446 |
| 2,626,559 | 1/1953 | Rau | 99—446 XR |
| 2,860,568 | 11/1958 | Magee | 99—339 |
| 2,975,698 | 3/1961 | Miller | 99—402 XR |

BILLY J. WILHITE, *Primary Examiner.*